Oct. 26, 1971  D. J. MATTESON  3,614,963
FLUIDIC PUSHBUTTON/OPERATORS
Filed March 11, 1969  3 Sheets-Sheet 1

INVENTOR.
DAVID JON MATTESON
BY
Meyer, Tilberry & Body
ATTORNEYS

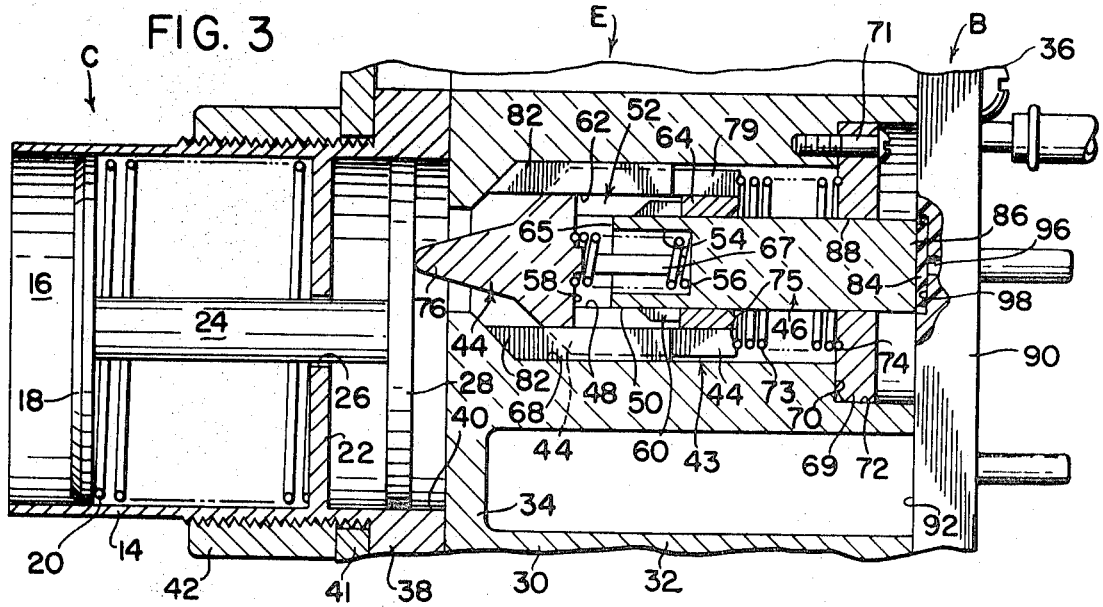
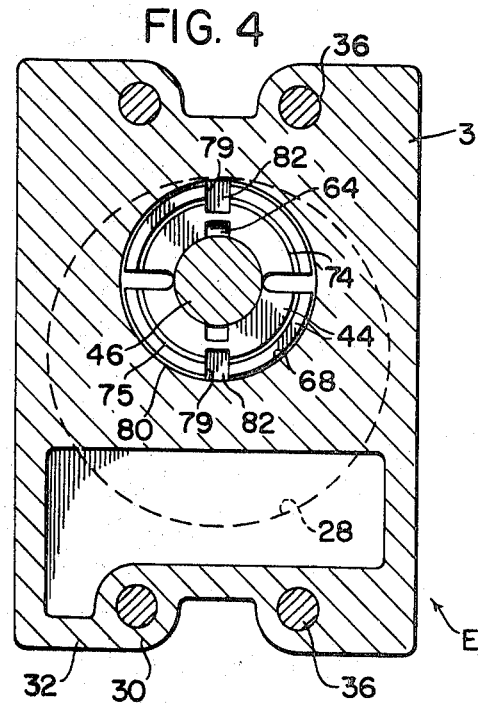
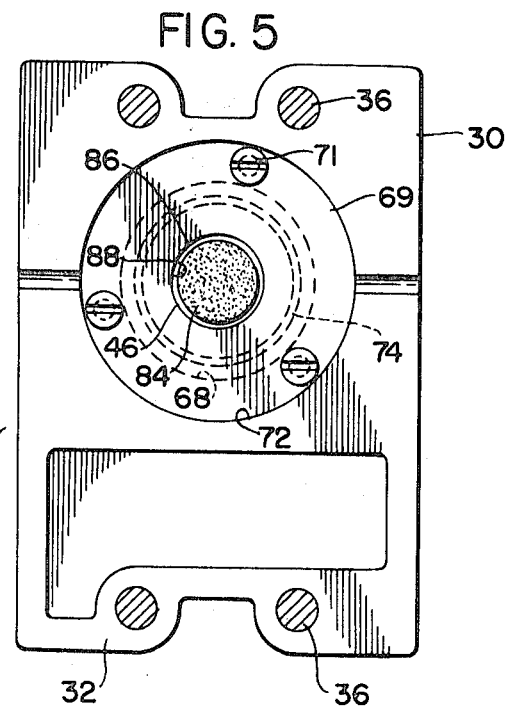
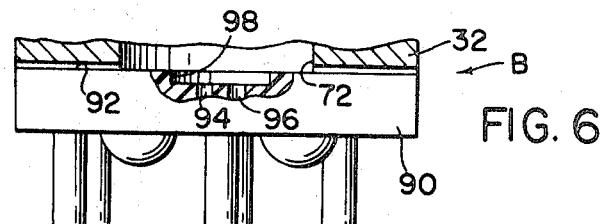

Oct. 26, 1971   D. J. MATTESON   3,614,963
FLUIDIC PUSHBUTTON/OPERATORS
Filed March 11, 1969   3 Sheets-Sheet 3

INVENTOR.
DAVID JON MATTESON
BY
Meyer, Tilberry & Body
ATTORNEYS

United States Patent Office 3,614,963
Patented Oct. 26, 1971

3,614,963
FLUIDIC PUSHBUTTON/OPERATORS
David Jon Matteson, Drexel Hill, Pa., assignor to Gulf + Western Industrial Products Company, Grand Rapids, Mich.
Filed Mar. 11, 1969, Ser. No. 806,166
Int. Cl. F15c 3/00
U.S. Cl. 137—81.5                                                   8 Claims

ABSTRACT OF THE DISCLOSURE

A novel fluidic switch for fluidic control circuits comprising a switch housing, a module affixed to said housing containing at least one fluidic gate; a plurality of ports for said gate; vent means associated with one of said ports; a closure movable in said housing for blocking said vent means; and an operator for actuating said closure; said switch further comprising means adapted to provide the operator with an amount of over-travel after the closure blocks said vent means.

---

The present invention relates to fluidic control circuits, and more particularly to a novel fluidic switch for such circuits.

For purposes of this application, the term "switch" shall mean the fluidic counter part of an electrical switch device, adapted to be positioned in at least one circuit for opening and closing the circuit.

The present invention is particularly applicable to fluidic control circuits for the control of machinery, such as machine presses, and will be described with particular reference thereto, although it will be appreciated that the invention has broader application, for instance in process control.

In the control of machinery, it is necessary for the control circuit to perform a number of on-off functions; for instance, start and stop of the machinery, emergency stop, and others. In the case of presses, it may be desirable to cycle the press continuously, or execute a single stroke and then stop, or simply to jog the press forward in a plurality of short movements. In the case of boring mills, milling machines, and other types of machinery, a plurality of similar functions are required of a control circuit, all such functions requiring clean on-off signals.

Fluidic circuits of the type to which the present invention is directed comprise a plurality of components arranged in accordance with a circuit logic, some of the components being fluidic amplifiers of the type in which a power jet is deflected to one of two output connections. Normally, standard miniature pneumatic valves are employed to interrupt or transmit a signal input to these components or to the circuits containing the components.

These valves are of two types, poppet and spool, both of which suffer from a number of disadvantages in a fluidic control circuit. One principal disadvantage particularly with the spool valve is that the output of the valve is proportional to the displacement of the spool, and if the spool is not completely depressed, the output will not reach full flow. Simply, the device does not produce a clean on-off signal. Certain logic situations (that is, element combinations) require a sharp rise-time or high rate-of-change signal and the switching time or characteristic of the conventional spool valve is inadequate.

The poppet spool valve is more common for this type of application, partly because of cost advantages, and also because the output verses displacement characteristic of the valve is somewhat better. That is, full flow is achieved with shorter travel. However, even with this type valve, the rise-time or rate-of-change characteristic is dependent upon how rapidly the operator depresses the pushbutton for the valve.

Although malfunctioning of a control circuit is serious enough, the use of these valves can result in serious safety problems. This becomes apparent when considered in light of certain applications. For instance, in a press control circuit, it frequently is desirable to operate the press either on a single stroke or a continuous stroke basis, the latter involving repeat strokes of the press. Separate signal connections are required in the logic circuit to perform the different functions, and with the use of spool or poppet spool valves, there is the problem that partial flow can be obtained at both connections, or that two positive control signals can be obtained. An operator may expect that only a single stroke of the press will occur, whereas the press could continue to stroke.

A known pneumatic-mechanical pushbutton for use in fluidic circuits is arranged to "trip" close the spool at the bottom of the operator travel, so that either an on or an off condition is obtained. However, this means that the output signal is not established unless the pushbutton is completely depressed, and extreme care still must be exercised on the part of the machine operator in use of these pushbuttons. If such a pushbutton is used in conjunction with emergency-stop of a press, it is apparent that again a serious safety problem could exist.

Aggravating the problem of use of these valves in a fluidic control circuit is the fact that operators of machines are used to the feel of an electrical pushbutton employed in electrical control circuits, and the feel of a pneumatic-mechanical pushbutton arranged to actuate a poppet or spool valve is clearly different, requiring relearning on the part of the operator and again extreme care.

Another problem associated with the use of valves in fluidic circuits is that they frequently are positioned on the machine in a control panel spaced a substantial distance from the logic components with which they are associated. The valves and connecting lines are miniature in size, and that fact, plus the fact that the output from the valves is always at a slightly lower pressure than the input when used in a fluidic circuit, results in an attenuation of pressure which can in turn result in a lost-signal condition in certain applications of fluidics.

A further problem experienced with the use of some conventional spool and poppet valves in fluidics, for instance the use of a simple vent valve, is the very limited logic function which they perform; either from a plus to a zero output, or vice versa. Most logic functions require one or more control or signal inputs, such as at C and D, for passing or not passing an output from A to B, similar to the capability of an electrical logic circuit. To have this capability, it is necessary to employ with some valves at least two, and often more, fluidic gates. The additional gates not only increase the cost of the circuit, but also reduce the design flexibility available to the designer.

It is an object of the present invention to overcome the above problems, and in particular to provide a fluidic switch which produces a clean on-off signal suitable for machine control.

It is further an object of the present invention to provide a fluidic switch which requires no more than ordinary care on the part of the operator and in this respect has the same characteristics and feel as an electrical pushbutton.

It also is an object of the present invention to provide a fluidic switch which offers the designer of a fluidic circuit maximum design flexibility, and simplfies and reduces the cost of the circuit.

These and other ojects are achieved in accordance with the present invention by providing a novel fluidic switch for fluidic control circuits which comprises a switch housing; a module affixed to said housing including at least one fluidic element; a plurality of ports for said element; vent means associated with one of said ports; a closure movable in said housing for blocking said vent means; an operator for actuating said closure; and means for providing said operator with an amount of over-travel when the closure is moved against said vent means.

Preferably, the fluidic element is a fluidic amplifier comprising a power jet port, at least one control input port, and a signal output port, said vent means being associated with the control input port.

In accordance with an aspect of the invention, the module contains both first and second fluidic amplifiers including an inhibit control input port opposite the control input port of the second amplifier; the vent means being connected to the first amplifier control input port and to the second amplifier inhibit control input port, said piston means being arranged to simultaneously close said vent means.

As a further aspect of the invention, the closure comprises first and second piston members movable axially in the housing, spring means holding the members in a spaced apart relationship, said first piston member blocking the vent means, the operator actuating the second piston member whereby the spring means provides the over-travel for said operator.

It will become apparent that the fluidic switch in accordance with the invention not only provides the same feel as that of an electrical pushbutton, but also functions in the same way. With respect to the former, the spring forces to actuate the pushbutton are the same as now used in the machine tool industry for electrical control, the point of actuation being at mid-pushbutton stroke with over-travel to the bottom of the button stroke. With respect to the latter, the signal is a pure on-off output in that, depending upon the position of the switch closure, there is either a passing or a not-passing output.

In addition, it will become apparent that the switch in accordance with the present invention offers considerable design flexibility, providing a means for obtaining a large number of combinations of input and output connections to perform various logic functions.

Other advantages will be apparent to those skilled in the art, the invention, objects, and advantages thereof becoming apparent upon consideration of the following specification, with reference to the accompanying drawings, in which FIG. 1 is a flow diagram illustrating the principles of the invention;

FIG. 3 is a section view of the switch of FIG. 2 in a partially depressed position;

FIG. 4 is a section view through line 4—4 of FIG. 2;

FIG. 5 is a section view through line 5—5 of FIG. 2;

FIG. 6 is a section view through line 6—6 of FIG. 2;

Figure 1:
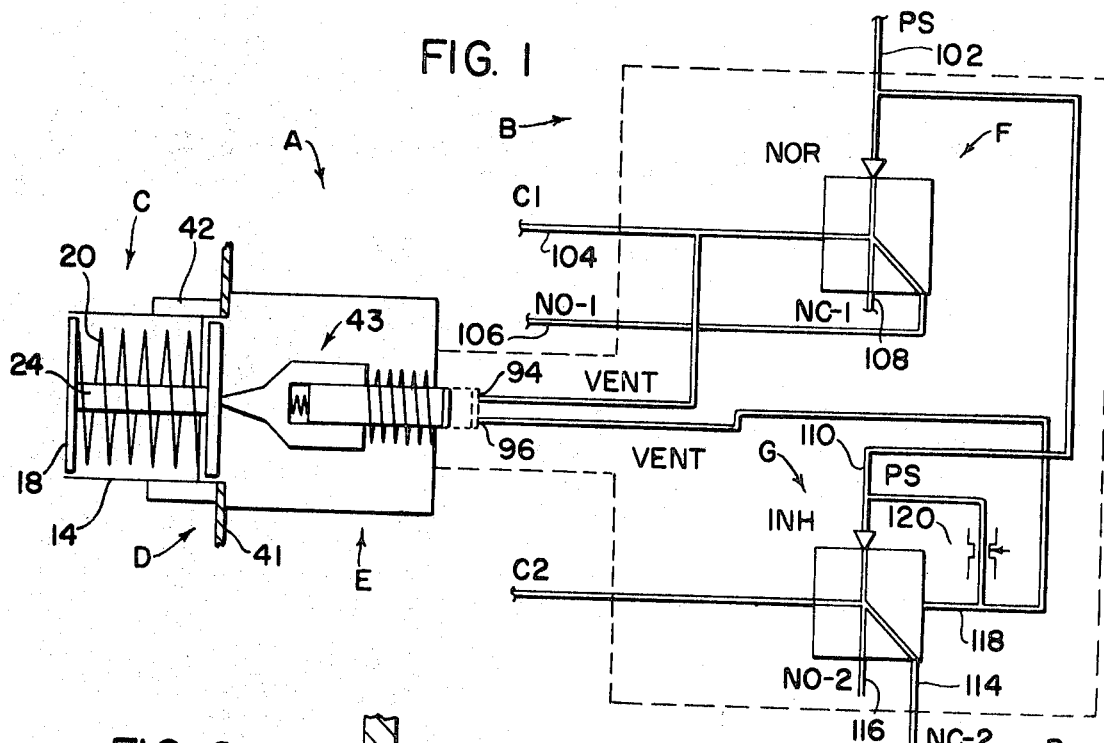

Referring now to the drawings, wherein the showings are for the purposes of illustrating the preferred embodiment of the invention only and not for the purpose of limiting the same, the figures show a fluidic switch A which is comprised basically of three working groups, a module B by which a control signal is passed or not-passed (equivalent to the contact of an electrical switch), an operator C on the exposed side D of the switch, and an interface E between the module and operator, defined as that portion of the switch which converts the mechanical motion of the operator to a fluid output. Although the module B will be described in greater detail, it is fabricated so as to contain at least one, and preferably two or more fluidic gates, for instance, a NOR gate F and an Inhibit gate G.

The operator C is a standard device presently used in the electrical control industry and is shown (in FIGS. 2 and 3) in the form of a pushbutton, although a wide variety of other types and shapes of operators can be used in accordance with the concepts of the invention. The operator is comprised of a cylindrical casing 14 which has an exposed open end 16 and contains an operator disc 18 movable axially within the casing and held outwardly by means of coil spring 20. The latter is seated against an inner plate 22 secured near the bottom of the casing 14 remote from the open end 16. Keyed to the operator disc 18 is an operator stem 24, which is coaxially centered in the casing 14 and is movable with the operator disc along the axis of the chamber guided by a centered aperature 26 in the plate 22. Connected to an end of the operator stem, opposite the end connected to the operator disc 18, is an inner actuating disc 28. The actuating disc is positioned so that it slides away from the plate 22, still within the cylindrical casing, on depressing or movement of the operator disc 18 and stem 24 to the right.

Figure 2:
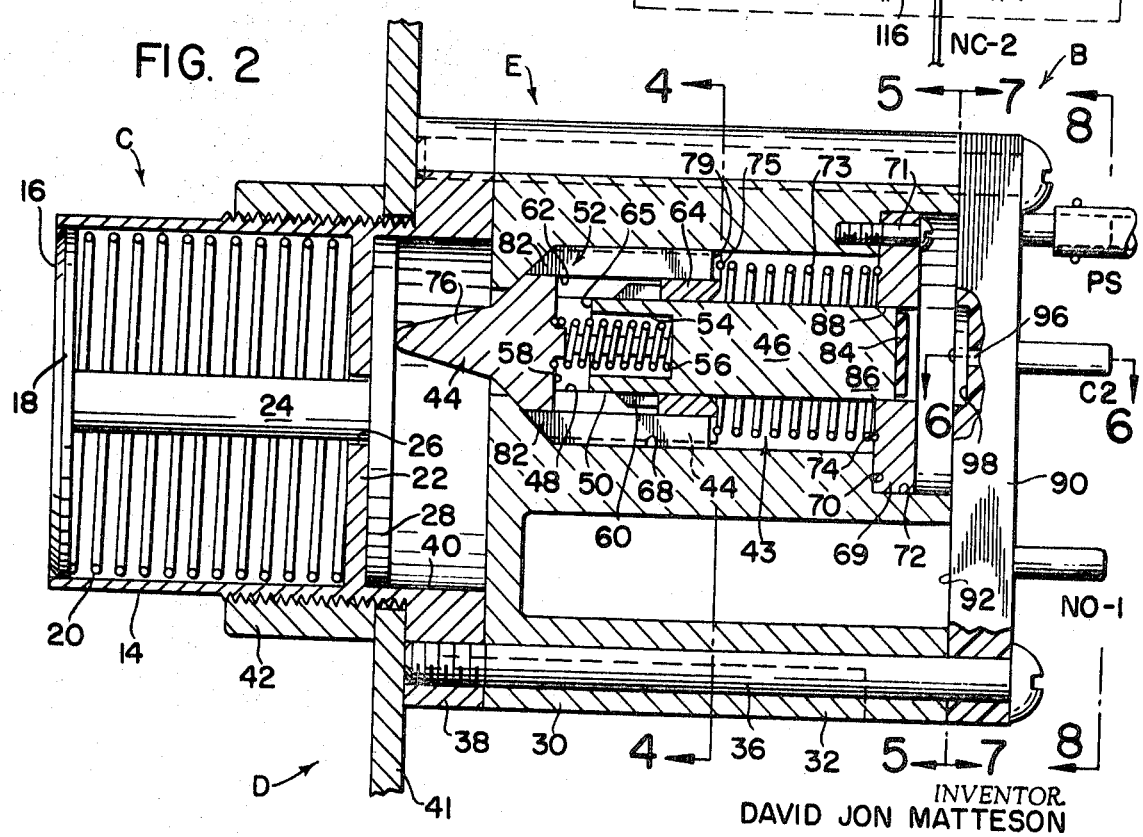
FIG. 2 is a section view of the fluidic switch in accordance with the invention.

To fasten the operator onto a control panel, identified as item 41, FIGS. 2 and 3, having an exposed side D, the operator C is provided with a threaded sleeve 42 which clamps the panel to a flange 38 adjacent the bottom end 40 of the operator casing 14.

The interface E (best shown in FIGS. 2–5) is similar in function to the contact block housing of an electrical switch device and holds the components responsible for contact closure and separation. It is comprised of six major components, including a housing 30 which holds the working components in correct relationship to the operator C and module B. The housing is rectangular in shape including side walls 32 and an end wall 34 against which the operator C is held, the operator being held to the end wall by means of a plurality of spaced bolts 36 which engage the outer flange 38 of the operator casing 14.

Within the interface housing 30, offset from the axis of the housing, a compound spring loaded piston assembly 43 (shown in FIGS. 2 and 3) receives the movement of the operator disc 18 and is actuated thereby. The piston assembly comprises an outer piston 44 and an inner piston 46 coaxially arranged so that the inner piston slides axially within the outer piston. This is accomplished by providing the outer piston with an inner cylindrical surface 48 along its axis, and the inner piston with an outer cylindrical surface 50 of slightly lesser diameter adapted to ride within the inner surface 48. The upper end 52 of the inner piston, that end which seats within the outer piston inner surface, is provided with a cylindrical hollow seat 54 facing the outer piston and containing a coil spring 56 which seats against the bottom wall 58 of the (outer piston) inner surface 48, providing a force which tends to hold the inner and outer pistons in an extended relationship.

Figure 10:
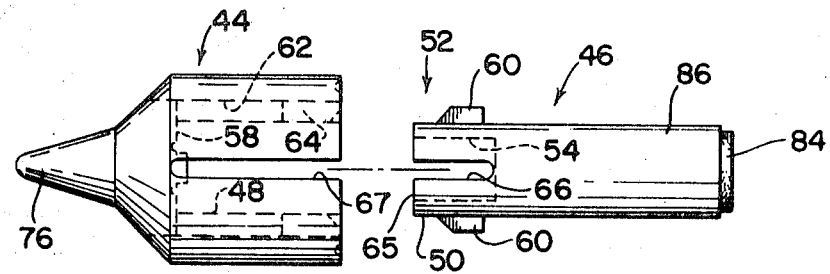

Lobes 60 are provided on opposite sides of the inner piston, spaced 180° apart, adapted to ride in longitudinally extendng guideways 62 similarly spaced and slotted into the inner surface 48 of the outer piston, to prevent the inner piston from rotating with respect to the outer piston. The separation of the inner piston relative to the outer piston is defined or limited by stops 64 at the lower end of the guideways 62, so that the lobes 60 of the inner piston seat against the stops urged by the separating force of the spring 56. In the opposite direction, compression of the piston assembly and spring 56 is limited by contact of the outer piston base surface 58 against the upper end 65 of the inner piston. It will become apparent that the spacing of surface 58 and stops 64 controls the amount of over-travel of the assembly, during operation. In addition stops 64 and lobes 60 prevent the assembly from coming apart. In this respect, the inner and outer piston members are provided with spaced longitudinally extending slots 66 and 67 (FIG. 10) which permit the two piston members to be deformed, allowing lobes 60 to ride within or over stops 64 and seat within the guideways 62; i.e., allow the inner piston member to be assembled within the outer member.

Figure 9:
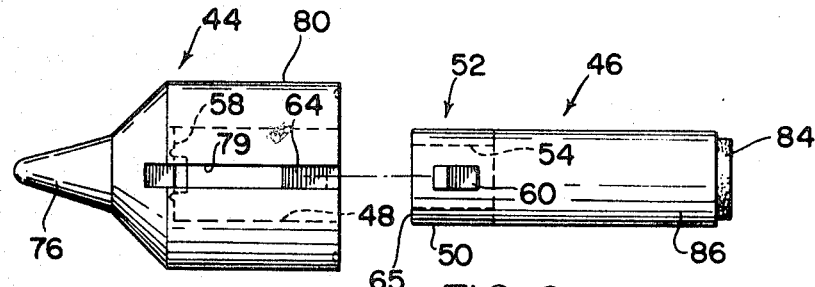
FIGS. 9 and 10 are plan and elevation views respectively of components of the switch of FIG. 2.

The compound spring loaded piston assembly is seated within a cylindrical chamber 68 (FIGS. 2, 3 and 4) of the housing, secured within the chamber by means of a spring retainer 69, the latter being fastened to the housing base 70 by means of a plurality of fasteners 71. As shown, the base 70 of the housing is provided with a circular depression 72 and the retainer 69 is placed in the upper end of the depression. Seated in the housing chamber 68, between the spring retainer 69 and the outer piston 44 is a coil spring 73 which urges the outer piston against the actuating disc 28, the spring seating in grooves 74 and 75 in the retainer and piston member. The outer piston is provide with a nose 76 which seats against the actuating disc 28. To prevent rotation of the outer piston within the housing chamber 68, longitudinally extending guideways 79 (FIG. 9) are provided in the outer surface 80 of the outer piston along the sides thereof, opposite the inner guideways 62 (notice FIG. 4), spaced 180° apart, engaging radially and longitudinaly extending lobes 82 on the inner surface of the housing chamber 68.

Completing the compound piston assembly is a soft rubber pad 84 fastened to the forward end 86 of the inner piston 46, the function of which is to be described. To permit movement of the inner piston 46, the spring retainer 69 is apertured with opening 88 (FIGS. 2 and 3) through which the piston moves.

Other modes of assembly of the inner and outer pistons than the snap-deform mode described (employing lobes 60 which ride over stops 64) can be used. For instance, the outer piston can be provided with inner bayonet-type slots, and the inner piston with opposed lobes or keys which ride into and lock in the slots. This alternative may even be desirable in applications where the materials used for the piston members have limited inherent flexibility. Obviously, the present invention is not limited to a particular mode of assembly.

The module B is the third principal component of the switch, and comprises a flat rectangular block 90 which is fastened to the bottom side of the interface housing 30 by means of the bolts 36. Essentially, using known techniques, the module is fabricated to include as an integral part thereof at least one fluidic gate, the details of which will be described. On the rearward side 92, (shown in FIG. 7), which side faces the piston assembly 43, the module is provided with two vent openings 94 and 96. With reference to FIGS. 2 and 3, the vent openings are in the bottom of a shallow depression 98 in the side 92, and are aligned with the direction of movement of the inner piston 46 so as to be covered by the rubber pad 84 when the inner piston is depressed or moved to the end of its stroke.

In operation, the interface is actuated by the depressing of the operator disc 18, moving the operator stem 24 axially to the right (FIGS. 2 and 3). This in turn moves the inner actuating disc 28 to the right, causing the outer piston 44 also to travel within the housing chamber 68 to the right, collapsing spring 73. The inner piston 46 is depressed to the right along with the outer piston under the force of the coil spring 56 between the pistons, the inner piston moving until the pad 84 comes against the module. This is about half of the stroke of the operator disc 18 (note FIG. 3), over-travel of the outer piston and operator disc 18 being permitted by compression of the spring 56 between the inner and outer pistons. The amount of over-travel is limited to the length of the outer piston inner guideways 62.

The purpose of preventing rotation of the inner and outer pistons relative to the housing is to prevent abraiding the rubber pad against the module.

The spring retainer 69 permits removal of the module from the interface without disassembly of the interface. To disassemble the latter, it is a simple matter, after removing the module, to remove the spring retainer and withdraw the piston assembly.

Details of the module B are shown in FIGS. 1 and 6-8. By way of example the module will be described as having fabricated into it two gates, one known as a NOR gate (item F, FIG. 1) and the other as an INH (Inhibit-Or) gate (item G), the purpose of the two gates being to provide normally-closed (passing) and normally-open (not passing) contacts which are opened and closed respectively on depressing the operator disc 18.

The NOR gate in this example is the normally-open gate and is connected into a pneumatic circuit so that there is no output signal from the gate until the operator disc 18 is depressed and there is a signal input. The gate is of conventional configuration comprising a power jet port PS (102), a signal input or control port (104) designated C1, an output port (106) designated (for purposes of this application) as NO–1, and a straight-through output port (108) designated (also for purposes of this application) as NC–1. The designations NO and NC mean normally open and normally closed, and represent the condition of the gate normally when the operator disc is in an undepressed position.

Associated with the C1 signal input connection is the vent 94. As long as the vent is open, i.e., the operator disc 18 is not depressed, the control input at C1 will bleed through the vent and no output will be realized at NO–1, the through-flow being to port NC–1 (108). However, on depressing the operator disc closing the vent, the resulting control input at C1 (104) deflects the power jet to the NO–1 port. It should be apparent the designations NO and NC are in reference to the switch (the module and vent closure combined) and not just the gate.

Since this is to be a normally open gate, in the logic circuit of FIG. 1, the NO–1 port is the one connected into the fluidic circuit, the NC–1 port being vented to atmosphere.

The INH gate G is known configuration, also provided with a power jet port PS (110), a C2 signal control input port (112), and passing and not-passing ports NC–2 (114) and NO–2 (116), respectively. In this example, this gate represents a normally closed contact, so that the NC–2 port is the one connected into a fluidic circuit.

In addition to the above ports, the gate is provided with an inhibit port 118, opposite the control port 112, an inhibit input being provided by supplying a portion of the power jet through resistor 120 to the inhibit side of the gate. Normally there is no inhibit input, as the inhibit port 118 is connected to vent 96 so that the flow bled through resistor 120 is vented. The gate therefor performs as a standard NOR gate, and in the presence of a control input at C2, the power jet is deflected to the circuit connection NC–2, the gate thereby representing a normally closed contact. On depressing the operator disc 18, the vent 96 is blocked so that the power jet flow is shifted to port NO–2 by the resulting inhibit port input, thereby opening the contact.

The reason why an inhibit gate is used, for a normally closed contact, with the vent connected to the inhibit port, is that the position of the gate, i.e., opened or closed, should be independent of the signal condition; and, at the same time, no signal output should be realized at the circuit output connection in the absence of an input signal at C2. If a simple NOR gate is used with the NC connection connected into the fluidic circuit, there would be a signal output at NC (the straight-through connection), even after the vent is closed by depressing operator 18 (for the purpose of opening the gate), if no signal exists at C1. With the inhibit gate, no signal output is realized when the operator is depressed and the vent is closed, regardless of the signal condition at C2; which is as it should be.

The logic of the compound switch should now be apparent. The purpose of the switch and module configuration is to alternately transmit separate control inputs in parallel circuits, and specifically to duplicate the normal run-jog switch in an electrical press control circuit. This switch comprises two contacts in parallel lines, and without going into details on the electrical circuit, the contacts are mechanically tied together, so that as one opens, the other closes. It is apparent that the pneumatic switch of the present invention described above accomplishes the same function. That is, as long as there are C1 and C2 inputs, on depressing the operator 18, the NC-2 output terminates and the NO-1 output commences.

Figure 7:
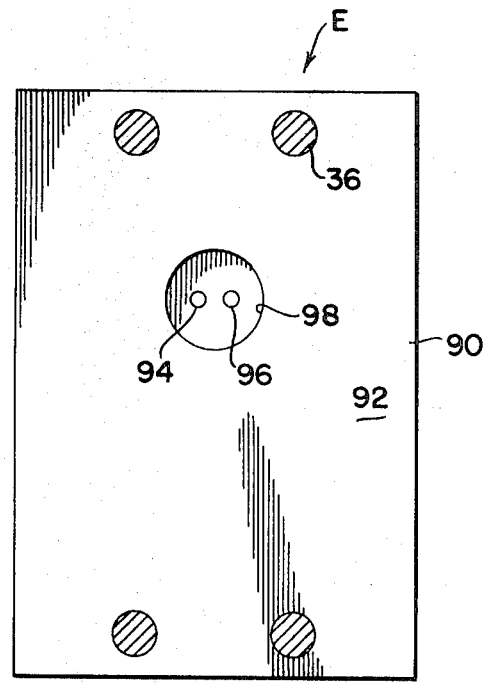
FIG. 7 is a section view through line 7—7 of FIG. 2.
Figure 8:
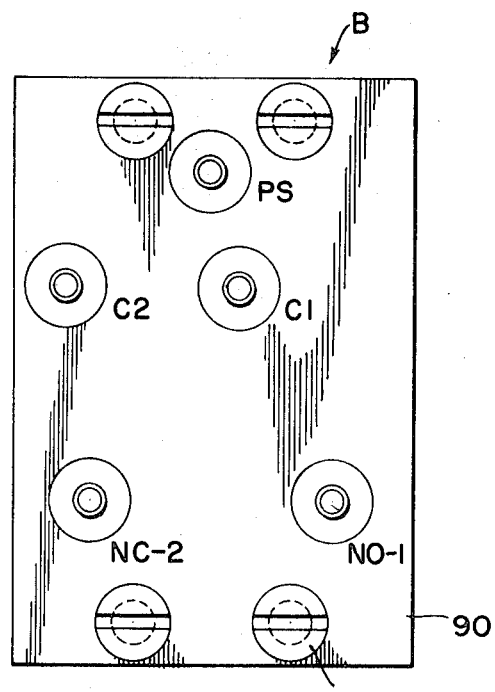
FIG. 8 is a section view through line 8—8 of FIG. 2.

FIGS. 7 and 8 show the location of the various connections. Essentially, the fluidic gates are molded into separate flat plates which are then sandwiched into the module, the ports being arranged and aligned as shown. From the bottom side of the module, FIG. 8, only the connections PS, C2, C1, NC-2 and NO-1 need be provided, the NC-1 and NO-2 ports leading to atmosphere.

Advantages of the invention should be apparent. Clearly the switch provides the same "feel" and "operation" as an electrical pushbutton. The spring forces to actuate the button are the same as those used in the machine tool industry for electrical control, and the point of actuation (signal change) is at mid-pushbutton stroke with overtravel to the bottom of the stroke. In addition, the signal is a pure on-off output which is unlike valve devices that may produce pressure signals proportional to the pushbutton displacement. That is, by virtue of the use of vents associated with an input port, either the C1 port of the NOR gate or the inhibit port of the INH gate, the gates being monostable devices, there is no signal change until the vents are blocked, and then the signal change is almost instantaneous.

Also avoided is the danger of a lost signal. As contrasted with the conventional valve, in which loss of pressure occurs, the switch preferably fabricated utilizing fluidic amplifiers, actually amplifies the control signal. Accordingly the switch can safely be used in a control panel remote from the logic or actuating components with which it is associated.

As a further advantage, maximum isolation between the fluid media and the mechanical parts of the switch is obtained since the actuator portion of the switch device only closes vent ports of the module. As distinguished from conventional valve devices, this reduces the probability of circuit contamination.

Further the available combination of control and output connections of the module of FIG. 1 provides maximum design flexibility and frequently permits the circuit designer to reduce the number of fluidic elements in certain systems. This can usually result in lower system costs.

As an example of the degree of flexibility, the NOR and INH gates can be connected without significant modification to perform the same function as a bleed valve and back-pressure switch, or a plain vented back-pressure switch. The characteristic of a back-pressure switch is that no external signal is used to shift the gate output, but rather internal bleed air is employed to cause a pressure rise at the control input to switch the power jet. To accomplish the function of a vented back-pressure switch, the NO-2 connection of the INH gate is simply jumped (by an external jumper) to the C1 input connection of the NOR gate. No input is provided at C2, the INH gate simply providing the input at C1. When the vent 94 at C1 is closed, the output of the NOR gate shifts from NC-1 to NO-1.

Although the switch module of FIG. 1 constitutes a novel and simplified logic component that has many applications, it is apparent that various other module designs are possible, and within the scope of the present invention containing fluidic elements other than a NOR and INH gate combination.

The following are some, by way of example.

One module configuration could utilize one or two Back-Pressure gates, similar to a NOR gate but each including a connection between the power jet port and the control input port through a resistor, bleed air from the power jet at the control input causing the power jet to shift from one output connection to the other. In this instance, the vents would be connected with the control input ports, the vents when open permitting the control flows to back-flow out the vents.

Another example is the use of one or two Schmitt Trigger gates, each having generally the configuration of an Inhibit-Or gate, except that the input opposite the control input port is biased by an adjustable resistor so that the output is shifted only if the control input is of a higher pressure than that established by the bias resistor. By locating the vent at either the control input port or the bias resistor port the gate is made either normally open or normally closed, respectively.

By the use of two NOR gates or two INH gates, two normally open or normally closed contacts can be provided.

As a further example, a NOR gate with the vent in the output leg provides a normally open switch; or to perform the simple zero to plus logic of a vent valve, the module could define a passive vent containing a simple through connection vented in the center adapted to be covered by the switch double piston. If desired, the module configuration can define one, two or more fluidic elements.

It should now be apparent that the switch in accordance with the invention provides not only design flexibility with the multiple connections of the module of FIG. 1, but also a novel means, using other modules, for performing a variety of other single or multiple logic functions.

The advantages of the invention from a logic point of view become particularly apparent when the invention is compared with fluidic circuits employing simple vent (tire) valves or spool valves. For instance, to perform simply the normally not-passing logic of the NOR gate portion of the switch device described above, a simple bleed or tire valve circuit would require in addition to the valve at least one fluidic gate. The valve itself performs only a plus to zero logic or vice-versa, and is not capable of passing or not-passing an output (from for instance a contact A to a contact B) in response to one or more control inputs.

It is possible for certain spool or poppet valves to perform logic functions. However, no satisfactory valve arrangement under a single pushbutton has heretofore been provided capable of multiple logic functions, such as those of the switch of FIG. 1. In particular, certain valves in response to a signal input can either initiate or terminate an output from a single input contact A to an output contact B, but no satisfactory way has been devised to combine these valves under a single pushbutton to simultaneously perform multiple logic functions, or combinations of logic functions. In this respect, again the module configuration of the invention can combine two, three or more fluidic elements.

As an additional advantage, the invention permits the construction of an interface which comprises both fluidic and electrical contacts actuated by a given standard control operator, which is not possible with most valve devices now marketed. The purpose of this would be to intermarry the two circuits. For instance, in the case of an emergency stop of a machine, it may be desirable to simultaneously disengage the machine clutch using a fluidic circuit and at the same time stop the machine motor through an electric circuit. To accomplish, this it is a simple matter to stack an electrical block between the actuator disc 28 and the interface housing 32, so that movement of the disc 28 closes or opens contacts of the electrical block as well as moves the piston assembly components of the interface.

The switch has been described as being in the nature of a pushbutton. A standard electrical component in addition to the pushbutton is a selector switch, wherein a control input is transmitted alternatively to multiple output connections, and it should be apparent that principles of the invention are applicable to this type of switch or function as well.

Although the invention has been described with respect to specific embodiments, other embodiments or variations within the scope of the following claims will be apparent to those skilled in the art.

What is claimed is:

1. A fluidic switch for fluidic control circuits comprising:
   a switch housing;
   a module affixed to said housing including at least one fluidic control device having a control port;
   means for venting associated with said control port of said control device;
   a closure assembly moveable within said housing to block said vent means, said closure assembly includes a piston assembly comprising first and second pistons axially moveable in said housing and relative to each other, said first piston being adapted to close said vent means, and first means for forcing said first and second pistons in an extended relationship; and,
   operator means for actuating said closure assembly, said operator means adapted to move said second piston whereby an overtravel for said operator is provided by said first forcing means after said first piston blocks said vent means.

2. A switch according to claim 1 including second means for forcing said piston assembly into spaced relationship relative to said vent means, said second means for forcing including less forcing strength than said first means for forcing.

3. A fluidic switch for fluidic control circuits comprising:
   a switch housing;
   a module affixed to said housing including first and second fluidic control devices, each said control device comprising a power jet input port, a control input port and a signal output port, said output port adapted to be connected into a fluidic circuit to constitute the output ports at which a signal output occurs in the presence of a control signal at said input ports, said first control device further including an inhibit input port opposite said control input port therefore;
   means for venting associated with said first control device inhibit input port and with said second control device control input port;
   closure means movable in said housing for simultaneously closing said vent means; and,
   operator means to actuate said closure means.

4. A switch for operatively controlling a fluidic circuit which includes at least one fluidic control device, said switch comprising:
   an elongated body member including an internal chamber area extending substantially the length thereof, said chamber including an end wall at one end thereof;
   means for venting at least one control port for said circuit disposed in said wall;
   a piston assembly received in said chamber for switching said fluidic circuit, said assembly having a first non-shifted position wherein said control port is vented and said circuit is in a first operative condition and a second fully shifted position axially spaced therefrom in association with said venting means to prevent any venting and thereby cause said control port to actuate said circuit to a second operative position, said piston assembly including a first piston slidably received in said chamber, said first piston including a longitudinal axis and a coaxial recess extending at least part way therethrough; a second piston slidably received in said recess and including means for closing said venting means; and, first means for forcing said first and second pistons axially apart from each other and second means for forcing said first piston axially apart from said wall.

5. A switch as defined in claim 4 wherein said first and second piston means include means for preventing rotational movement of said pistons relative to each other.

6. A switch as defined in claim 4 further including means for shifting said piston assembly disposed in an axial operative relationship with said first piston at the open end of said chamber.

7. A switch as defined in claim 4 wherein said first and second means for forcing comprises compressible springs, said second forcing means having a lesser resistance to compression than said first forcing means.

8. The switch as defined in claim 4 wherein said wall comprises a module which includes said fluidic circuit integral therewith.

References Cited
UNITED STATES PATENTS

| | | | |
|---|---|---|---|
| 3,234,934 | 2/1966 | Woodward | 137—815 X |
| 3,339,569 | 9/1967 | Bauer et al. | 137—815 |
| 3,504,689 | 4/1970 | Lazer | 137—815 |
| 3,034,628 | 5/1962 | Wadey | 137—815 |
| 3,072,147 | 1/1963 | Allen et al. | 137—815 |
| 3,091,393 | 5/1963 | Sparroue | 137—815 |
| 3,107,850 | 10/1963 | Warren et al. | 137—815 X |
| 3,443,575 | 5/1969 | Hughes | 137—815 |
| 3,452,665 | 7/1969 | Furlong | 137—815 X |
| 3,473,545 | 10/1969 | Boyadjieff | 137—815 |
| 3,481,351 | 12/1969 | Reilly et al. | 137—815 |

SAMUEL SCOTT, Primary Examiner